United States Patent [19]

Keiser

[11] 4,390,901
[45] Jun. 28, 1983

[54] METHOD AND APPARATUS FOR CONTROLLING THE OPERATION OF A TELEVISION SIGNAL RECEIVER

[76] Inventor: Edmond Keiser, Loferweg 6, Gröbenzell, Fed. Rep. of Germany, 8031

[21] Appl. No.: 197,672

[22] Filed: Oct. 16, 1980

[30] Foreign Application Priority Data

Dec. 14, 1979 [DE] Fed. Rep. of Germany ....... 2950432

[51] Int. Cl.³ .......................................... H04N 9/491
[52] U.S. Cl. .................................... 358/147; 358/142; 358/310
[58] Field of Search ............ 358/142, 146, 147, 194.1, 358/114, 117, 120, 123, 4

[56] References Cited

U.S. PATENT DOCUMENTS

| 3,854,123 | 12/1974 | Banach | 358/194.1 |
| 4,079,419 | 3/1978 | Siegle | 358/117 |
| 4,205,343 | 5/1980 | Barrett | 358/147 |
| 4,246,611 | 1/1981 | Davies | 358/194.1 |
| 4,292,650 | 9/1981 | Hendrickson | 358/114 |

Primary Examiner—Michael A. Masinick
Attorney, Agent, or Firm—Darby & Darby

[57] ABSTRACT

A method and apparatus for controlling the operation of a video recorder to enable it to record selected types of programs is disclosed. A code signal representing information with respect to the type of program is provided at the transmitter and inserted into the vertical blanking gap of the television signal. The video recorder detects and analyzes the code signal and is actuated for recording when a selected type of program is detected.

6 Claims, 2 Drawing Figures

METHOD AND APPARATUS FOR CONTROLLING THE OPERATION OF A TELEVISION SIGNAL RECEIVER

BACKGROUND OF THE INVENTION

This invention relates to a method and apparatus for controlling operation of a television signal receiver. The apparatus controls the operation of the receiver unit in response to program information transmitted with the television signal.

In television signal receivers cooperating with video recorders it is generally known to employ a timing device for energizing and/or deenergizing the receiver unit at a preselected time. This offers the possibility of recording a predetermined program during the user's absence for watching it at a later time, since it is not necessary that the television set be manually switched on at the starting time indicated in the program journal. It frequently happens, however, that a program scheduled for a definite time is postponed or even cancelled. Employ of a timing device in this case leads to the desired program being incompletely or not at all recorded by the video recorder. Moreover, the employ of a timer may lead to imperfections in a recording under various circumstances, such as in case of interruptions caused by film breakage or the like, advertising spots transmitted within the announced transmission time for a desired program, announcements, and programs transmitted at a not exactly predeterminable time, e.g. sports events.

SUMMARY OF THE INVENTION

It is an object of the present invention to provide a method and apparatus of the type indicated in the introduction, permitting the operation of a television signal receiver unit to be controlled more effectively.

In order to attain this object, the invention provides a method including the steps of:

(a) providing a program information at the transmitter side, (b) inserting the program information into the vertical blanking gap of the television signal to be transmitted, (c) detecting and analyzing the program information at the receiver side, and (d) actuating the receiver unit in response to the result of the analyzing step.

The employ of the method according to the invention ensures that the television signal receiver unit is operated only for the desired program, i.e. that the unit records only the desired program, or only the desired program is displayed on the screen, respectively. Energization and/or deenergization of the receiver unit is carried out independently of the actual time. This means for instance that the unit is not prematurely energized in case of a delayed program. If the desired program is cancelled, the receiver unit is not switched on at all. The method is compatible with the transmission of video text, under certain conditions it is even possible to employ existing video text devices for inserting the program information. In addition to energizing and deenergizing the receiver unit it is also possible to actuate the unit in another manner, such as switching over to another station, rewinding of the recorder for recommencing after an interruption etc.

In a preferred embodiment of the subject method, the invention provides that the program information detected at the receiver side is compared to at least one selection criterion stored at the receiver side, and that the receiver unit is energized and/or deenergized in response to predetermined criteria being satisfied. Independent protection is claimed for this feature. The program information employed may for instance be a multiple code.

Each part or section of such code may contain different information. Thus one code section may indicate the program category (e.g. culture, news, entertainment etc.), while another section may be coded with a more restricted specification (e.g. cinema play, opera, news etc.). If for instance "culture" is stored at the receiver side as a selection criterion, the receiver unit will be switched on for every "culture program" (and possibly off at the end of each program). If the two criteria "culture" and "magazine" are stored at the receiver side, the unit will only be switched on for "culture magazines", and remains inoperative for any other culture program, such as documentaries, and any other magazines, for instance political magazines. The program information may of course contain a program number for any specific program, so that the receiver unit may be preset to be switched on only for such specific program.

The apparatus according to the invention is characterized by a decoder responsive to program information transmitted within the vertical blanking gap, and by a analyzing means for actuating the receiver unit in response to the decoder output signal.

The apparatus according to the invention may be designed as an independent unit for employ as an accessory to existing receiver units (television sets or video recorders). In this case the apparatus would include a separate receiving section for processing the television signal to such a degree that the analysis of the information contained in the vertical blanking gap becomes possible. The apparatus may also, however, be integrated within the receiver unit, in which case the latter is to be operated in the "standby mode" for receiving the television signal. The receiver unit is then switched "fully on" in response to the transmitted program information.

In a further advanced embodiment, the invention provides that said analyzing means includes memory means for storing predetermined selection criteria, and that said analyzing means is operable in response to the program information as well as in response to the stored selection criteria. As already explained above in context with the method according to the invention, the apparatus according to the invention offers rather simple, albeit very versatile possibilities for programming the receiver unit. The stored selection criteria may also include a calendar, so that it becomes possible, for instance, to receive and/or record all detective plays transmitted up to a determined date or within a determined period. It is further possible in a simple manner to forbid any unsuitable programs for children pertaining to the household, so that the receiver unit can only be switched on for permitted programs. If for instance that children are to be prevented from watching detective plays, the receiver unit can be programmed to switch off at the start of any detective play and to enable it to be switched on to the respective channel after the end of the play. In a simplified form, the unit could also remain deenergized and resume operation only in response to the input of a code word unknown to the children.

BRIEF DESCRIPTION OF THE DRAWINGS

The present invention may be fully understood from the following detailed description taken together with the accompanying drawings in which.

The program information provided at the transmitter side may be introduced into the vertical blanking gap by means of an encoder apparatus in a similar manner as in the case of video text informations. The information may either be stored on a video tape, or may be provided by a process computer connected to the control desk. Alternatively, the information may be provided directly from the control desk.

The information code may for instance be divided into six sections. The individual sections may then for instance have the following meaning:

channel identification (station, network etc)

program category (e.g. culture, current events, entertainment etc)

subcategory (e.g. plays, opera, news etc)

specific program number recommended age group (e.g. adults, children 3-6 etc)

forbid/permit note (e.g. 12 years upwards).

This code is introduced in the vertical blanking gap, which has a duration of 1216 us, either at the start of each new program, or continuously.

Figure 1:
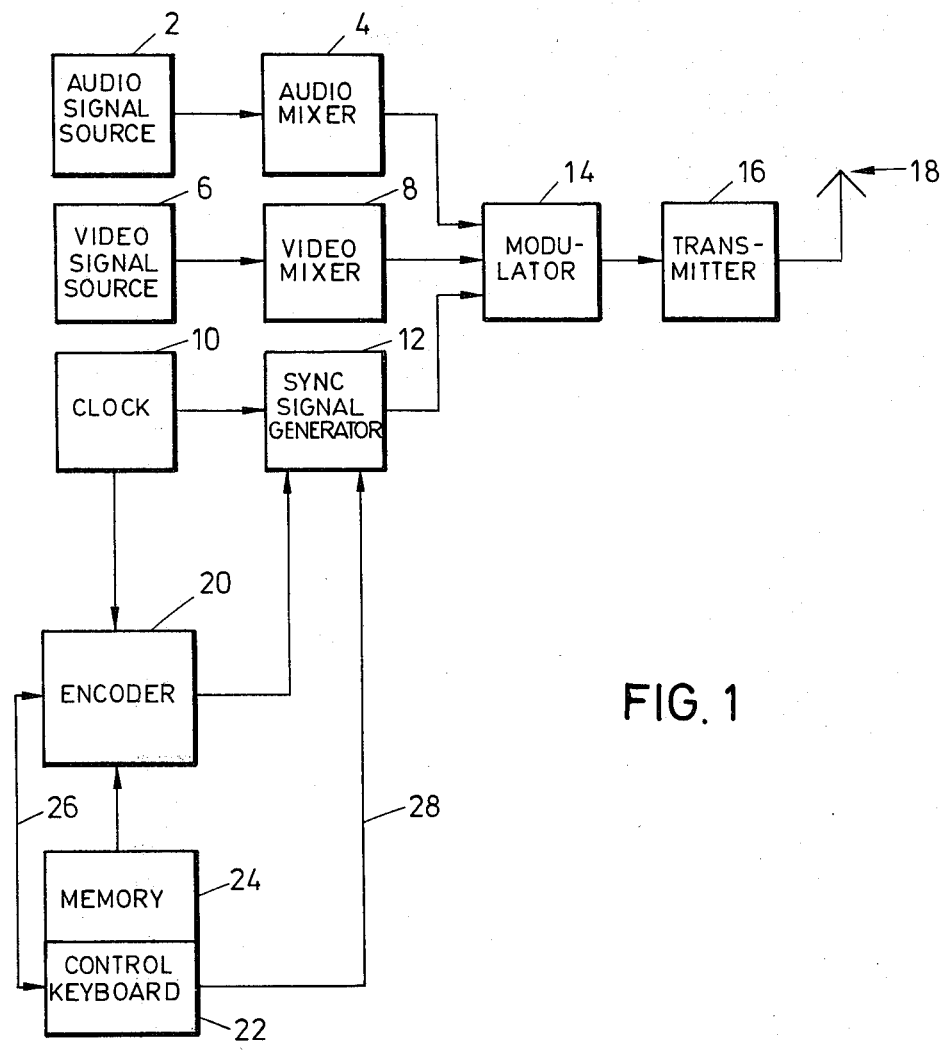
FIG. 1 is a block diagram of a transmitting station according to the present invention.

FIG. 1 shows one embodiment of a transmitter station including means for providing a program information and for inserting this program information into the vertical blanking gap of the TV signal. An audio signal source 2 is connected to an audio mixer 4, the output thereof being connected to one input of a modulator 14. A further input of the modulator 14 receives the output signal of a video mixer 8 being connected to a video signal force 6. A third input of modulator 14 is connected to the output of a synchronization signal generator 12 which receives clock pulses generated by a clock circuit 10. The output of the modulator 14 is connected to a transmitter 16, which outputs the radio frequency signal to an antenna 18. The arrangement described so far corresponds to well-known circuitries, and the operation thereof need not be described in detail.

For generating program information a control keyboard 22 is provided by which an operator may input certain information concerning general identification, program category and the like as outlined above. Connected to the control keyboard 22 is a memory 24 which may comprise a magnetic tape cassette or a RAM device for digitally storing the information inputted by said control keyboard 22. The output of memory 24 is connected to one input of an encoder 20. The encoder 20 comprises, for example, a parallel input/output circuit for generating subsequent pulses in accordance with the program information stored in memory 24 and for delivering pulses to one input of the synchronization signal generator 12. The operation of the encoder 20 is controlled by clock signals delivered from clock circuit 10.

In order to ensure that the program information is inserted into the vertical blanking gap properly, timed control keyboard 22 comprises a circuitry for providing control signals which are applied to encoder 20 and synchronization signal generator 12 via leads 26 and 28, respectively.

In operation, an operator may produce program information which is then stored within the memory circuit 24. When it is desired to insert the generated program information into the vertical blanking gap, the operator may generate control signals by actuating corresponding keys on the keyboard 22. The control signals are applied to the encoder 20 and the synchronization signal generator 12, so that the program information is properly timed inserted into the video signal.

The receiver unit for receiving the television signal may for instance be a conventional television set or a video recorder. If the unit is a conventional television set, a separate apparatus is to be employed for processing the incoming television signal and decoding the program information contained in the vertical blanking gap. The decoded information is supplied to an analyzer device which may be in the form of a microcomputer or the like. Provided additionally is a setting or storage unit consisting for instance of a plurality of incrementally operable switches.

For the following discussion it shall be assumed that the program information is introduced into the vertical blanking gap only at the start of a new program. The decoder decodes this program information and supplies it to the microcomputer employed as the analyzer means.

The microcomputer compares the program selection criteria stored by means of the setting or storage unit to the received program information, in response to which comparison it generates—or does not generate—an on/off actuating signal for the receiver unit. If for instance the selection criteria stored by means of the setting or storage unit specify "plays, children from 3-6", the analyzer means generates an "on" signal for the television set or video recorder only if the received code corresponds to these selection criteria. In this case it is then irrelevant whether the respective program is transmitted on the first, second or any other channel, as is the specific program number.

Figure 2:
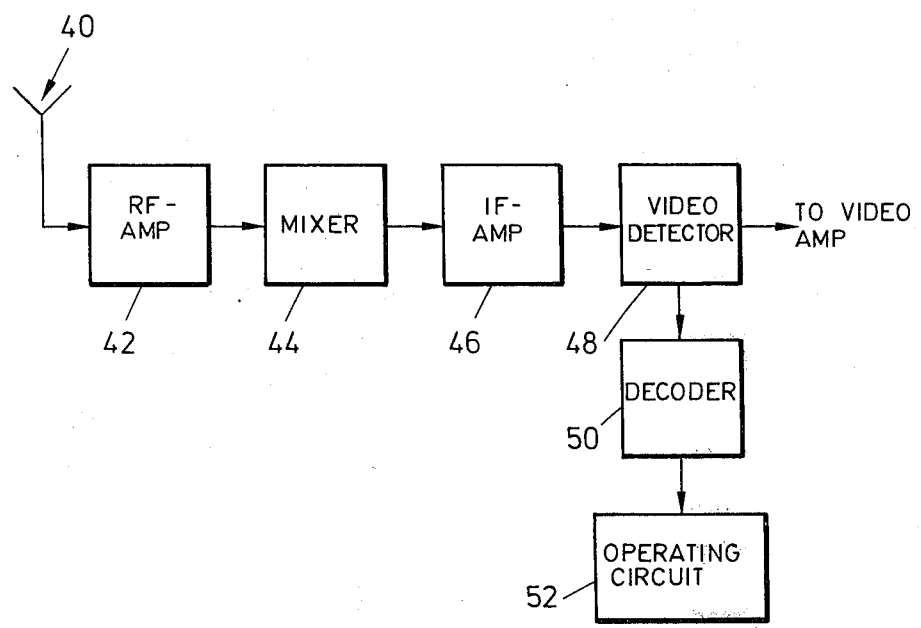
FIG. 2 is a block diagram of an apparatus for controlling operation of a television signal receiver according to the present invention.

In the following, one apparatus for receiving a video signal containing program information according to the present invention is discussed. FIG. 2 shows an antenna 40 which receives the radio frequency signal which is inputted into a RF amplifier 42. The output of the RF amplifier is inputted into a mixer circuit 44, the output thereof being connected to the input of an IF amplifier 46. The IF signal is detected by a video detector 48, one output thereof being connected to the video amplifier of the TV set. A further output of the video detector 48 is connected to the input of a decoder 50 connected to an operating circuit 52 which operates with the analyzer means mentioned above.

It is preferable that the program information which is to be inserted into the vertical blanking gap of the television signal is pulse code modulated. However, also other transmission techniques may be employed.

In new receiver units, the apparatus for detecting, decoding and analyzing the program information may be integrated within the unit itself. In this case the unit operates in the standby mode, with neither display nor recording taking place. As soon, however, as a predetermined program information corresponding to the stored selection criteria is detected, the receiver unit is switched on, so that the following program is displayed or recorded, respectively. At the end of each program, i.e. prior to the beginning of a subsequent program, the transmitter transmits a different program information causing the analyzer means to generate a signal for deenergizing the receiver unit.

I claim:

1. A method for controlling operation of a television signal receiver comprising the steps of:
   (a) providing a code signal representing information with respect to the type of program at the transmitter side,
   (b) inserting the code signal into the vertical blanking gap of the television signal to be transmitted therewith,
   (c) detecting and analyzing the code signal at the receiver side, and
   (d) actuating the receiver unit in response to detection of a predetermined code signal in said detecting step, characterized in that said actuating step includes controlling of a video recorder for recording a selected type of program.

2. A method according to claim 1, characterized by the step of comparing the code signal detected at the receiver side with at least one selection criterion stored at the receiver side and energizing/de-energizing the receiver unit in response to predetermined criteria being satisfied.

3. The method according to claim 2 wherein said code signal includes at least one of the following component signals:
   a channel identification signal;
   a program category signal;
   a subcategory signal;
   a specific program number signal;
   a recommended age group signal; and
   a forbid/permit note signal.

4. Apparatus for controlling operation of a television signal receiver in response to a code signal representing information with respect to the type of program, which code signal is transmitted with the television signal, comprising a decoder responsive to said code signal transmitted within the vertical blanking gap, and an analyzing means for actuating the receiver unit in response to a decoder output signal corresponding to a predetermined code signal, characterized in that the receiver unit comprises a video recorder the recording mode of which is controlled in response to said decoder output signal.

5. Apparatus according to claim 4, characterized in that said analyzing means comprises memory means for storing predetermined selection criteria, and in that said analyzing means is operable in response to the predetermined code signal as well as in response to the stored selection criteria.

6. Apparatus according to claim 4 wherein said code signal includes at least one of the following component signals:
   a channel identification signal;
   a program category signal;
   a subcategory signal;
   a specific program number signal;
   a recommended age group signal; and
   a forbid/permit note signal.

* * * * *